(12) United States Patent
Berglund et al.

(10) Patent No.: US 9,276,768 B2
(45) Date of Patent: *Mar. 1, 2016

(54) PROVIDING STATION CONTEXT AND MOBILITY IN A WIRELESS LOCAL AREA NETWORK HAVING A SPLIT MAC ARCHITECTURE

(71) Applicant: Nokia Siemens Networks Oy, Espoo (FI)

(72) Inventors: Jan Erik Johan Berglund, Cupertino, CA (US); Zheng Li, San Jose, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 250 days.

This patent is subject to a terminal disclaimer.

(21) Appl. No.: 13/785,161

(22) Filed: Mar. 5, 2013

(65) Prior Publication Data

US 2014/0254453 A1  Sep. 11, 2014

Related U.S. Application Data

(63) Continuation of application No. 12/154,493, filed on May 23, 2008, now Pat. No. 8,422,513.

(51) Int. Cl.
*H04L 12/46* (2006.01)
*H04W 36/12* (2009.01)
(Continued)

(52) U.S. Cl.
CPC ............ *H04L 12/4633* (2013.01); *H04W 8/26* (2013.01); *H04W 12/06* (2013.01); *H04W 36/12* (2013.01); *H04W 74/00* (2013.01); *H04W 84/12* (2013.01)

(58) Field of Classification Search
USPC .................................................. 370/312, 123
See application file for complete search history.

(56) References Cited

U.S. PATENT DOCUMENTS

| 5,428,615 A | 6/1995 | Backes et al. ................. 370/392 |
| 5,790,541 A | 8/1998 | Patrick et al. ................. 370/392 |

(Continued)

FOREIGN PATENT DOCUMENTS

| CN | 1764139 A | 4/2006 |
| CN | 101106528 A | 1/2008 |

(Continued)

OTHER PUBLICATIONS

"CAPWAP Protocol Specification draft-ietf-capwap-protocol-specification-10", P. Calhoun et al. editors, Mar. 13, 2008, 143 pgs.

(Continued)

*Primary Examiner* — Andrew Lai
*Assistant Examiner* — Jamaal Henson
(74) *Attorney, Agent, or Firm* — Harrington & Smith (57) ABSTRACT

A wireless access node receives a first frame from a station through a first communication network such as an IEEE 802.11 network. The first frame comprises a source address identifying the station. The wireless access node applies a function to the source address to derive a destination address identifying an access controller coupled to the wireless access node through a second communication network such as an IEEE 802.3 network. The first frame is encapsulated in a second frame that comprises the destination address identifying the access controller and a source address identifying the wireless access node, respectively. The wireless access node sends the second frame to the access controller having the destination address through the second communication network. The access controller owns association and authentication state of the station, and shares the association and authentication state of the station with the wireless access node when needed to support desired service.

20 Claims, 9 Drawing Sheets

(51) Int. Cl.
*H04W 74/00* (2009.01)
*H04W 84/12* (2009.01)
*H04W 12/06* (2009.01)
*H04W 8/26* (2009.01)

(56) References Cited

U.S. PATENT DOCUMENTS

| | | | |
|---|---|---|---|
| 6,018,526 A | 1/2000 | Liu et al. | 370/401 |
| 6,618,388 B2 | 9/2003 | Yip et al. | 370/401 |
| 6,643,287 B1 | 11/2003 | Callon et al. | 370/392 |
| 6,856,991 B1 | 2/2005 | Srivastava | 707/10 |
| 7,701,936 B2 | 4/2010 | Hongal et al. | 370/390 |
| 7,746,892 B2 | 6/2010 | Mohan et al. | 370/466 |
| 2001/0052025 A1 | 12/2001 | Maeda et al. | 709/238 |
| 2002/0080804 A1 | 6/2002 | Ando et al. | 370/401 |
| 2002/0097724 A1 | 7/2002 | Halme et al. | 370/392 |
| 2002/0194367 A1 | 12/2002 | Nakamura et al. | 709/238 |
| 2003/0043825 A1 | 3/2003 | Magnussen et al. | 370/401 |
| 2003/0063611 A1 | 4/2003 | Schaub et al. | 370/395.32 |
| 2003/0069993 A1 | 4/2003 | Na et al. | 709/245 |
| 2003/0081203 A1 | 5/2003 | Chen et al. | 356/300 |
| 2003/0142669 A1 | 7/2003 | Kubota et al. | 370/389 |
| 2003/0152075 A1 | 8/2003 | Hawthorne et al. | 370/389 |
| 2003/0165140 A1 | 9/2003 | Tang et al. | 370/393 |
| 2004/0081203 A1* | 4/2004 | Sodder | A61B 6/488 370/469 |
| 2004/0184408 A1 | 9/2004 | Liu et al. | 370/236 |
| 2004/0202171 A1 | 10/2004 | Hama | 370/395.1 |
| 2005/0169270 A1 | 8/2005 | Mutou | 370/390 |
| 2005/0220096 A1 | 10/2005 | Friskney et al. | 370/389 |
| 2006/0184694 A1 | 8/2006 | Monette et al. | 709/246 |
| 2006/0245438 A1 | 11/2006 | Sajassi et al. | 370/399 |
| 2007/0098006 A1 | 5/2007 | Perry et al. | 370/437 |
| 2007/0280258 A1* | 12/2007 | Rajagopalan | H04L 45/245 370/395.3 |
| 2008/0056277 A1 | 3/2008 | Sharma | 370/395.53 |
| 2009/0037607 A1 | 2/2009 | Farinacci et al. | 709/249 |
| 2011/0205959 A1* | 8/2011 | Aalto | H04L 45/00 370/328 |

FOREIGN PATENT DOCUMENTS

| | | |
|---|---|---|
| CN | 101119315 A | 2/2008 |
| CN | 101127696 A | 2/2008 |
| WO | WO 2006/085286 A1 | 8/2006 |
| WO | WO 2007/051300 A1 | 5/2007 |

OTHER PUBLICATIONS

IEEE Std 802.11-1997, "Information technology—Telecommunications and information exchange between systems—Local and metropolitan area networks—Specific requirements—Part 11: Wireless LAN Medium Access Control (MAC) and Physical Layer (PHY) Specifications", LAN MAN Standards Committee of the IEEE Computer Society, Approved Jun. 26, 1997, IEEE Standards Board, ISBN 1-55937-935-9, 459 pages.

IEEE Std 802.3, 1998 Edition, Information technology—Telecommunications and information exchange between systems—Local and metropolitan area networks—Specific requirements—"Part 3: Carrier sense multiple access with collision detection (CSMA/CD) access method and physical layer specifications", LAN MAN Standards Committee of the IEEE Computer Society, 1997, ISBN 0-7381-0330-6, 1262 pages.

* cited by examiner

PROVIDING STATION CONTEXT AND MOBILITY IN A WIRELESS LOCAL AREA NETWORK HAVING A SPLIT MAC ARCHITECTURE

CROSS-REFERENCE TO RELATED APPLICATION

This application is a continuation of U.S. application Ser. No. 12/154,493 filed on May 23, 2008. The above stated application is incorporated herein by reference in their entirety.

TECHNICAL FIELD

The exemplary and non-limiting embodiments of this invention relate generally to wireless communication systems, methods, devices and computer programs and, more specifically, relate to wireless local area networks.

BACKGROUND

Various abbreviations that appear in the specification and/or in the drawing figures are defined as follows:
AC access controller
AP access point
ARP address resolution protocol
CAPWAP control and provisioning of wireless access points
DHCP dynamic host configuration protocol
DNS domain name server
IP internet protocol
ISP internet service provider
MAC medium access control
STA station
vAC virtual access controller
WAN wide area network
WLAN wireless local area network WLAN has evolved from merely providing local area coverage from a single access point to providing a coverage area that encompasses many access points. A WLAN may span over a large enterprise campus or possibly even an entire metropolitan area. In recent years architecture development has included a "thin" access point concept. The idea is to have one central controller that manages many access points. This facilitates management of the access point(s) and the overall WLAN feature set. The thin access point concept is implemented by splitting the termination of the IEEE 802.11 MAC such that part is terminated on the access point itself, and another part is terminated on the access controller.

Figure 1A:
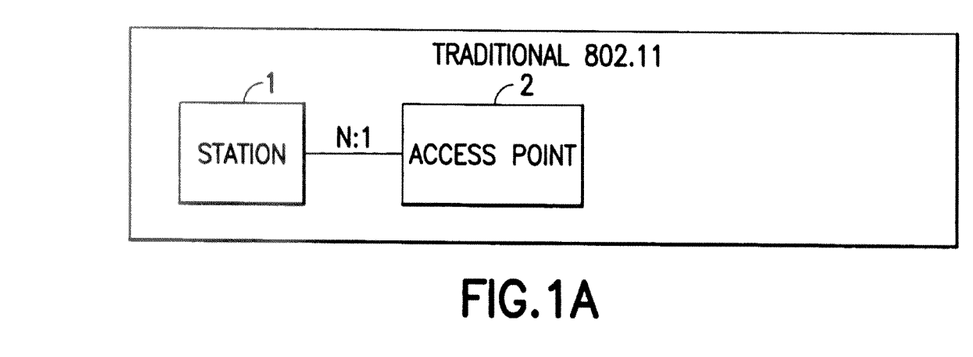
FIG. 1A illustrates a conventional WLAN model where a station is associated with one access point.

As is shown in FIG. 1A, in the basic WLAN model a station (STA) 1 is associated with one access point (AP) 2. Each access point 2 can handle many stations 1. In this type of relationship the operation of handling many stations 1 involves accommodating STA-AP association, STA authorization, and STA-AP confidentiality. As can be appreciated, if the access point 2 is lost for any reason the service for the STA 1 is lost.

This conventional approach presents a number of challenges as the size of the WLAN is increased to include multiple access points 2. For example, forming large IP subnets results in the presence of a significant amount of broadcast traffic over the WLAN caused by ARP (ARP flooding). To solve a mobility challenge and the ARP flooding challenge one may use mobile IP and reduce the number of subnets. However, a disadvantage of this approach is that the STA 1 needs to have mobile IP implemented, and only IP-based communication is usable. Once the connection between the STA 1 and the AP 2 is lost it needs to be reestablished from scratch, resulting in long handover time.

Figure 1B:
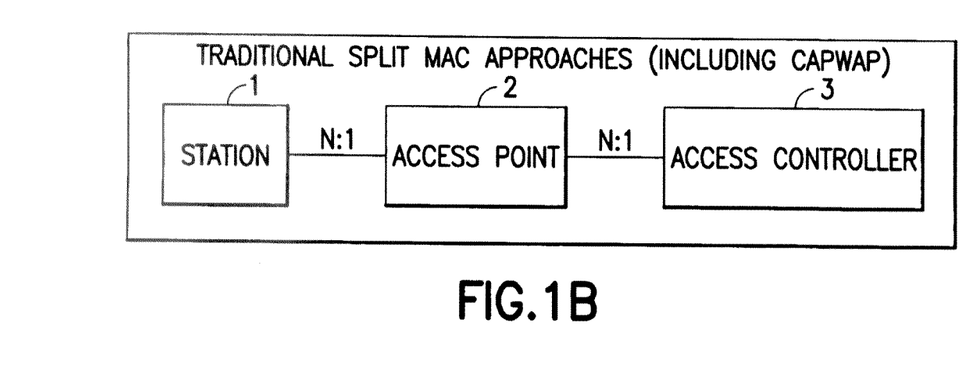
FIG. 1B illustrates a conventional split MAC WLAN model where a station is associated with one access point, and where the access point is associated with one access controller.

As shown in FIG. 1B, in a conventional split MAC approach the station 1 has a relationship to the access point 2 and indirectly to an access controller 3. The state of association, authorization and confidentiality can be shared between the access controller 3 and the access point 2, or it may be solely owned and managed by either the access controller 3 or the access point 2. In an extreme case where the access point 2 owns all of these relationships the WLAN devolves to the conventional architecture of FIG. 1A. Some split MAC implementations propose to at least partially alleviate the ARP flooding problem through the use of spoofing, using the access controller 3 as the central point.

One challenge presented by this approach relates to scalability, as each access controller 3 can handle only some maximum number of access points 2. Beyond this limit other techniques such as mobile IP need to be used.

To summarize, the traditional split MAC concept relies on a 1:N relationship between the access controller 3 and the access point 2. However, the use of this approach has certain disadvantages. For example, as the size of the WLAN increases the processing power of the access controller 3 needs to also increase. Further, a loss of the access controller 3 results in a loss of the wireless service for all the access points 2, as the access controller represents a single point of failure. Another disadvantage is that this concept results in a bundling of the management plane and the user plane processing. Further, in some implementations this approach can transport user plane traffic directly to the Ethernet medium, which introduces broadcast flooding problems related to the creation of large subnets. And in practice most enterprise Ethernet switches are not capable of supporting more than 64K-128K MAC addresses, thus severely limiting the number of station 1 the WLAN network can support.

The IETF CAPWAP group is currently in the process of standardizing a split MAC transport protocol (see CAPWAP Protocol Specification, draft-ietf-capwap-protocol-specification-10, P. Calhoun et al. editors, Mar. 13, 2008). CAPWAP is focused on handling the access point 2 from a controller, and is related to the traditional split MAC approach discussed above.

There are different approaches to the traditional split MAC concept, e.g., where portions of the IEEE 802.11 MAC are terminated on the access controller 3 over an IP tunnel, and some over Ethernet.

When designing a large WLAN with, for example, 10,000+ stations 1 (end users) and 1,000 or more access points 2 it becomes difficult for these conventional approaches/proposals to scale up accordingly, both from a management plane and a user plane perspective.

SUMMARY

The foregoing and other problems are overcome, and other advantages are realized, by the use of the exemplary embodiments of this invention.

In a first aspect thereof the exemplary embodiments of this invention provide a method that includes receiving a first frame at a wireless access node, the first frame being received through a first communication network and comprising a source address; applying a function to the source address to derive a destination address; encapsulating the first frame in a second frame that comprises the destination address and a source address identifying the wireless access node; and sending the second frame to a second communication network for receipt by a destination node having the destination address.

In another aspect thereof the exemplary embodiments of this invention provide a memory medium that stores computer program instructions, the execution of which by a data processor results in operations that comprise receiving a first frame at a wireless access node, the first frame being received through a first communication network and comprising a source address; applying a function to the source address to derive a destination address; encapsulating the first frame in a second frame that comprises the destination address and a source address identifying the wireless access node; and sending the second frame to a second communication network for receipt by a destination node having the destination address.

In another aspect thereof the exemplary embodiments of this invention provide an apparatus that comprises a receiver configured to receive a first frame at a wireless access node, the first frame being received through a first communication network and comprising a source address; a controller configured to apply a function to the source address to derive a destination address and to encapsulate the first frame in a second frame that comprises the destination address and a source address identifying the wireless access node; and a transmitter configured to send the second frame to a second communication network for receipt by a destination node having the destination address.

In a further aspect thereof the exemplary embodiments of this invention provide a method that includes receiving a first frame at an access controller, the first frame being received through a first communication network and comprising a destination address that identifies one of a plurality of virtual MAC addresses associated with the access controlled the first frame further comprising a source address that identifies a wireless access node in a second communication network; extracting a second frame that is encapsulated in the first frame, the second frame comprising a source address identifying a station in the second communication network and a destination address; and sending the second frame for receipt by a node having the destination address.

In a further aspect thereof the exemplary embodiments of this invention provide a memory medium that stores computer program instructions, the execution of which by a data processor results in operations that comprise receiving a first frame at an access controller, the first frame being received through a first communication network and comprising a destination address that identifies one of a plurality of virtual MAC addresses associated with the access controller, the first frame further comprising a source address that identifies a wireless access node in a second communication network; extracting a second frame that is encapsulated in the first frame, the second frame comprising a source address identifying a station in the second communication network and a destination address; and sending the second frame for receipt by a node having the destination address.

In yet another aspect thereof the exemplary embodiments of this invention provide an apparatus that includes a receiver configured to receive a first frame at an access controller, the first frame being received through a first communication network and comprising a destination address that identifies one of a plurality of virtual MAC addresses associated with the access controller, the first frame further comprising a source address that identifies a wireless access node in a second communication network; a controller configured to extract a second frame that is encapsulated in the first frame, the second frame comprising a source address identifying a station in the second communication network and a destination address: and a transmitter configured to send the second frame for receipt by a node having the destination address.

DETAILED DESCRIPTION

The exemplary embodiments of this invention provide a novel WLAN architecture. The exemplary embodiments extend the concept of the relation between the "access point" and "access controller" to a concept that focuses on the relationship between the "station" and "access controller". Aspects of the exemplary embodiments of this invention provide the use of a function, such as abashing function, between the station and the access point, provide access point clustering, and provide tunneling between the access point and access controller. These aspects of the exemplary embodiments of this invention provide enhanced scalability and other benefits.

The use of these exemplary embodiments enables larger WLAN domains to be realized with readily implemented network-related features, such as layer 2 mobility and end user traffic shaping, in networks having many (e.g., thousands) of access points. This is accomplished while still maintaining fundamental IEEE 802.11 WLAN and IEEE 802.3 Ethernet characteristics.

By partitioning the semantics relationship into several different relationships it becomes possible to achieve enhanced characteristics beyond the traditional split MAC approaches.

Figure 2A:
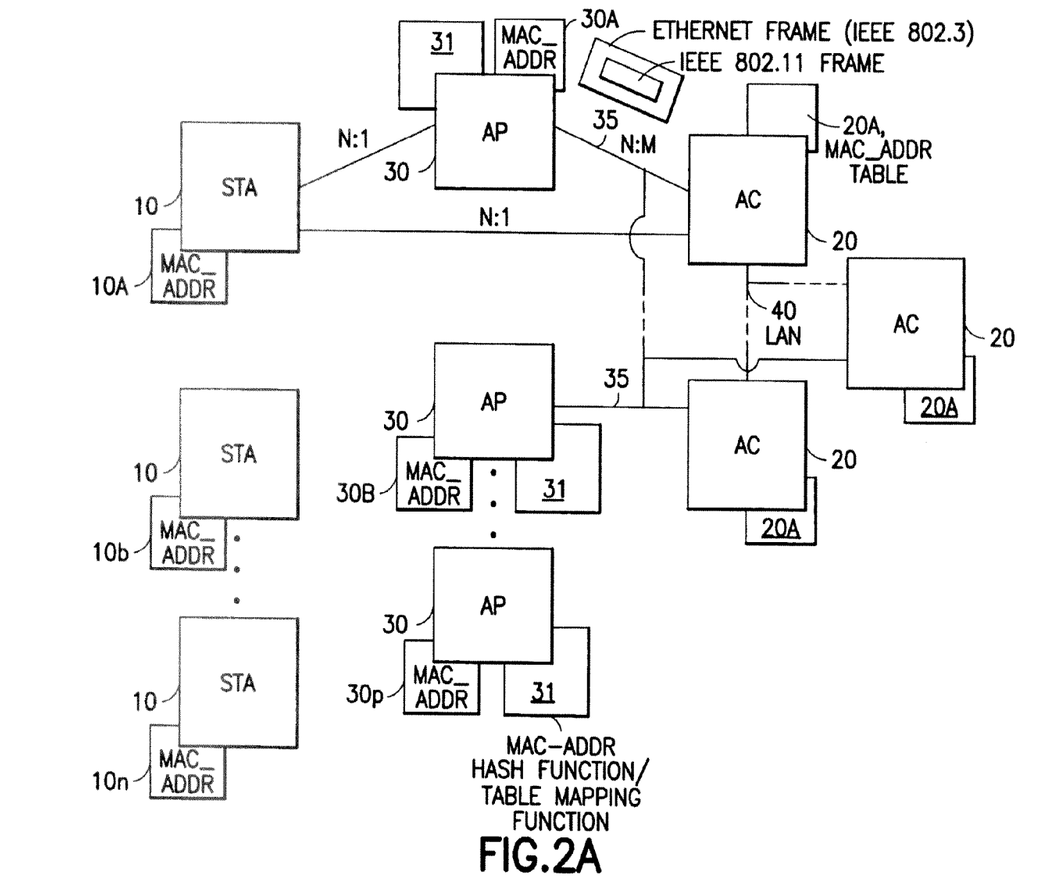
FIG. 2A illustrates a split MAC WLAN model in accordance with the exemplary embodiments of this invention, where a station is associated with an access point and with an access controller, and where there is a N:M relationship between each access point and a set of access controllers.

Referring to FIG. 2A, the use of these exemplary embodiments creates a direct relationship between a station (STA) 10 and an access controller (AC) 20. The access controller 20 handles a certain number of stations 10, which are assigned to one particular AC 20 using a deterministic mapping function, such as a hash function. Each access point (AP) 30 derives knowledge of which access controller 20 to forward the station 10 traffic to based on hashing the station 10 MAC identification (MAC ID). For this purpose each AP 30 may be assumed to include a MAC_ADDR hash function/table mapping function 31. The mapping function 31 maps the IEEE 802.11 source address of a given STA 10 (e.g., the MAC_ADDR 10A, 10B. . . . , 10n) to one of the plurality of AC 20 addresses for use as a destination address for the IEEE 802.3 outer frame. The access controller 20 shares the association and the authentication state of the station 10 with the access point 30, but it is the access controller 20 that is the main owner of this information. While the access points 30 may change over a connection, one particular station 10 remains associated with the same access controller 20 during a connection. In exemplary embodiments all access point specific MAC functions may reside with the access point 30, while station-oriented MAC functions are processed by the access controller 20.

Figure 2B:
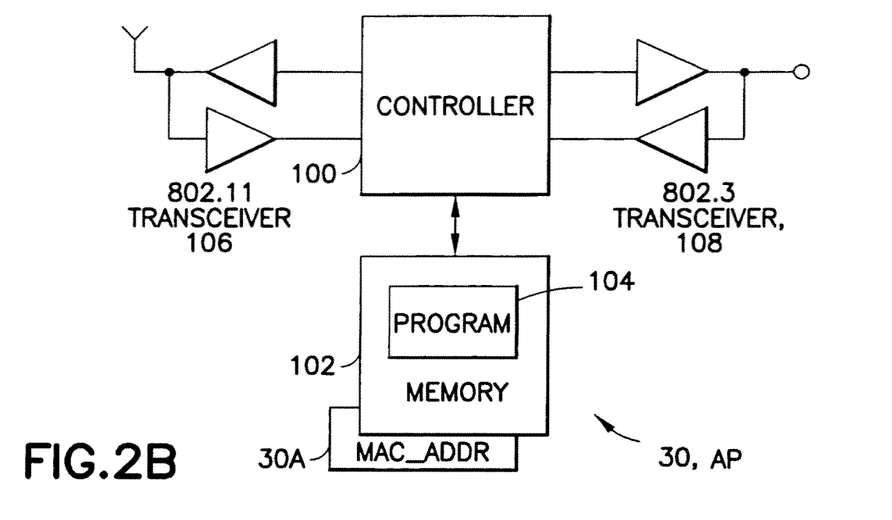
FIG. 2B is a simplified block diagram of one of the access points shown in FIG. 2A.
Figure 2C:
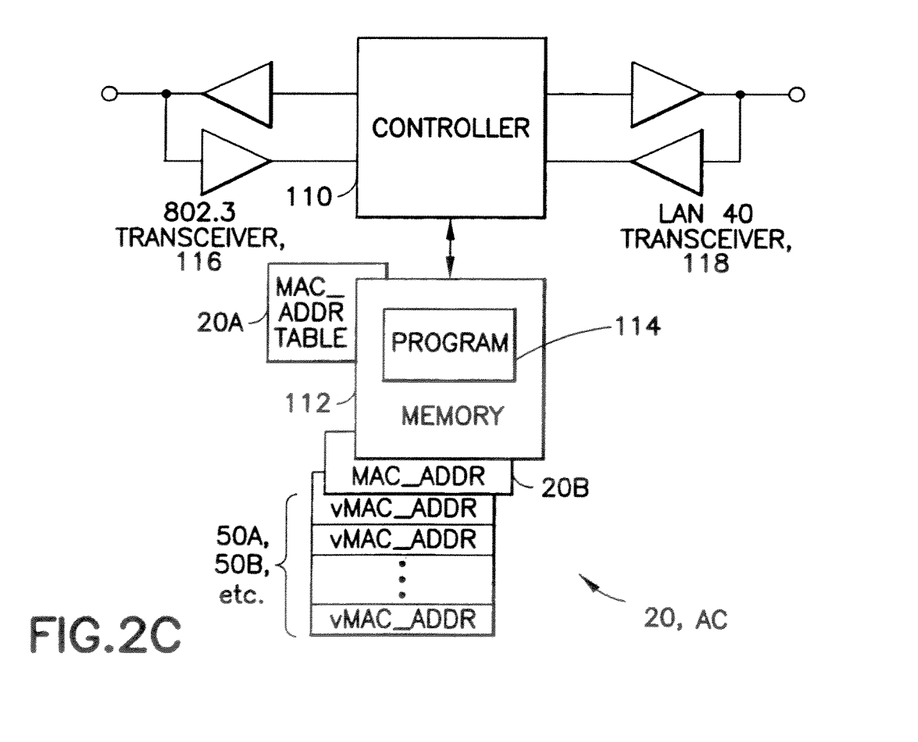
FIG. 2C is a simplified block diagram of one of the access controllers shown in FIG. 2A.

FIG. 2B shows one of the APs 30. The AP 30 includes a controller 100, such as one or more computers/microprocessors/digital signal processors coupled with a memory 102. The memory 102 stores at least the MAC_ADDR (e.g., 30A) of the AP 30 as well as computer program instructions 114 suitable for controlling operation of the AP 30 in accordance with these exemplary embodiments. For example, the program 114 includes instructions/routines to implement the MAC_ADDR hash function/table mapping function 31, as well as to encapsulate a received IEEE 802.11 frame within an IEEE 802.3 frame as described herein. Further in this regard the AP 30 includes a suitable IEEE 802.11 wireless transceiver 106 for bidirectional communication with the STAB 10, and a suitable IEEE 802.3 transceiver 108 for bidirectional communication with the ACs 20. FIG. 2C shows one of the ACs 20. The AC 20 includes a controller 110, such as one or more computers/microprocessors/digital signal processors coupled with a memory 112.

The memory 112 stores at least the physical MAC_ADDR 20B of the AC 20 as well as computer program instructions 114 suitable for controlling operation of the AC 20 in accordance with these exemplary embodiments. For example, the program 114 includes instructions/routines to implement the MAC_ADDR hash function table mapping function, as well as to extract an encapsulated IEEE 802.11 frame from within an IEEE 802.3 frame, as well as to cooperate with other ACs 20 to allocate and reallocate as needed virtual MAC address (vMAC_ADDRs). The memory 114 also stores a MAC_ADDR table 20A, as well as at least one (and typically several) vMAC ADDR associated with the AC 20 (referred to as vMAC_ADDRs 50A, 50B, etc. in FIGS. 8 and 9). The AC 20 includes a suitable IEEE 802.3 transceiver 116 for bidirectional communication with the APs 30, and a suitable transceiver 118 for bidirectional communication with other ACs 20 of an AC cluster 25 (see FIGS. 8 and 9) using VLAN 40. Transceiver 118 may also be an IEEE 802.3 transceiver. The AC 20 may also include a separate bidirectional interface for communication with a WAN 60 (see FIGS. 8 and 9).

Figure 8:
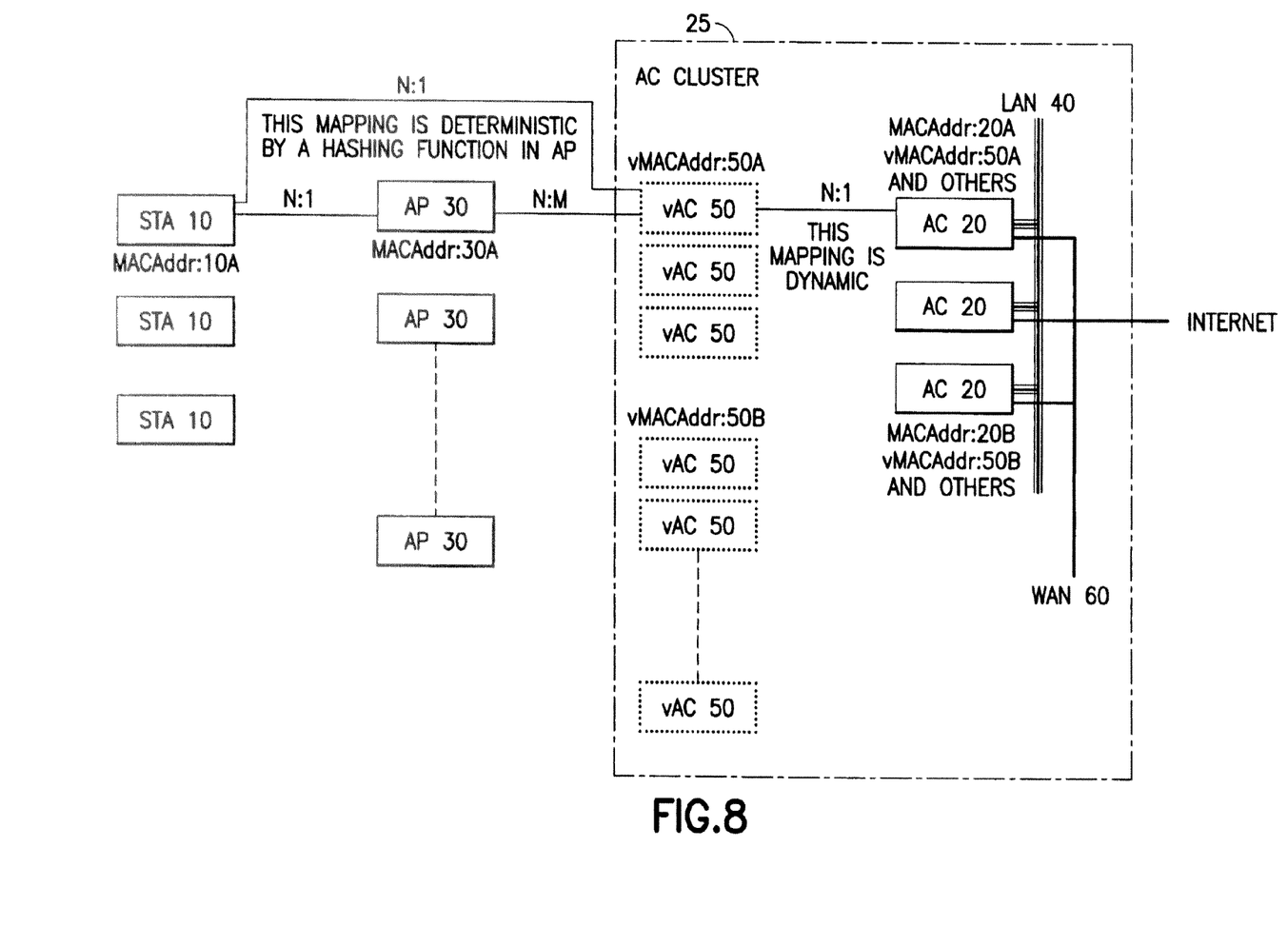
FIG. 8 is a simplified system-level block diagram that shows a STA-AP-Virtual AC-Real AC relationship in accordance with the invention.

In a typical use case there will be a plurality of STAs 10, a plurality of APs 30, and a plurality of ACs 20. Each AP 30 may be assumed to have a unique MAC_ADDR 30A, 30B, . . . , 30p). The ACs 20 are interconnected via a network, such as a local area network (LAN) 40, to enable AC-AC and other communications, as described below. The LAN 40 may be referred to as a virtual LAN (VLAN), and may be based on, for example, an Ethernet link that supports broadcast transmissions between ACs 20. The plurality of ACs 20 enable clustering, and they may be hosted in a data center of the network operator and interconnect by the high speed LAN 40. As shown in FIG. 8, the ACs 20 may also be connected with a wide area network (WAN) 60 that provides access to, for example, the Internet 46 (shown in FIG. 4).

Figure 4:
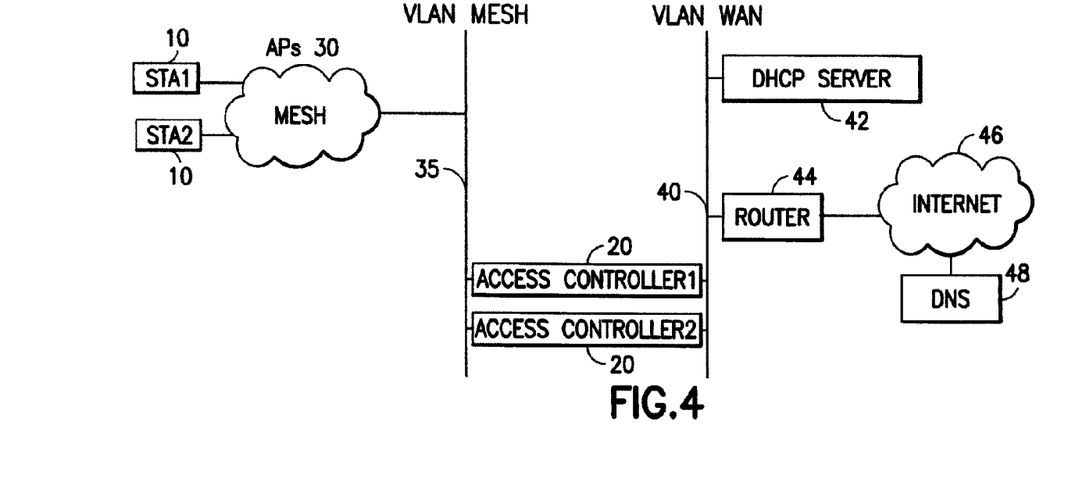
FIG. 4 shows a non-limiting example of an overall network architecture wherein the exemplary embodiments of this invention may be implemented.

FIG. 4 shows a non-limiting example of an overall network architecture having a plurality of STAs 10 (e.g., STA1, STA2) bidirectionally coupled with a wireless mesh that includes the APs 30. The APs 30 are coupled via a VLAN mesh, such as one implemented using Ethernet connections 35, to the ACs 20 (e.g., AC1, AC2). The ACs 20 are coupled to the VLAN 40 that in turn provides connectivity with various communication network entities such as a DHCP service 42 and a router 44. The DHCP function is one that automatically assigns temporary IP addresses to client stations (e.g., the STAs 10) logging onto an IP network, and eliminates a need to manually assign permanent static IP addresses. The router 44 provides connectivity to the internet 46 having connected therewith various DNSs 48.

Figure 5:
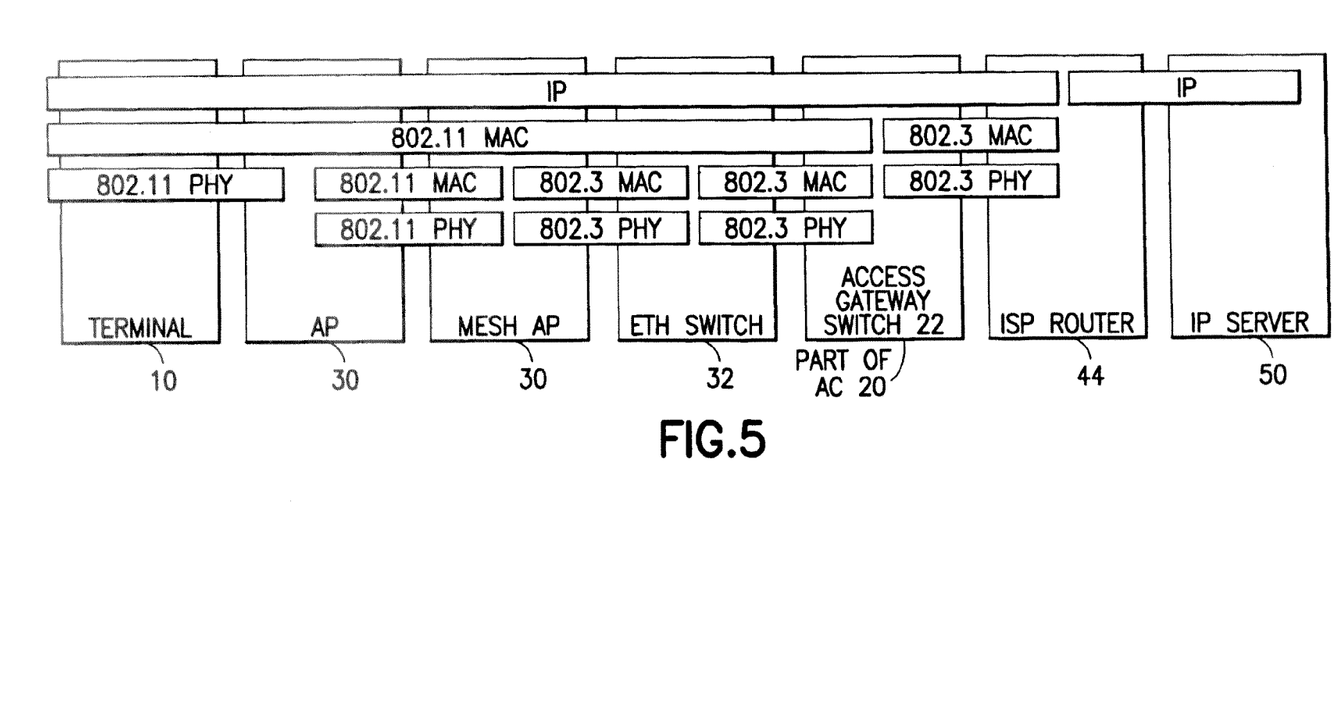
FIG. 5 shows various interfaces and applicable standards/specifications for the embodiments of FIG. 4.

FIG. 5 shows the various interfaces and applicable standards for the system/network example shown in FIG. 4. Applicable standards and specifications may include, in addition to IP, for the wireless portion between the STAs 10 and the APs 30 the IEEE 802.11 physical layer and MAC layer standards and specifications (IEEE Standard for Information technology, Telecommunications and information exchange between systems, Local and metropolitan area networks, Specific requirements Part 11: Wireless LAN Medium Access Control (MAC) and Physical Layer (PHY) Specifications), and for the VLAN mesh 35 and the VLAN 40 the IEEE 802.03 physical layer and MAC layer standards and specifications, (IEEE Standard for Information technology, Telecommunications and information exchange between systems, Local and metropolitan area networks Specific requirements, Part 3: Carrier sense multiple access with collision detection (CSMA/CD) access method and physical layer specifications). FIG. 5 shows the presence of the Ethernet switch 32 and an access gateway switch 22 that may form part of the AC 20. At least one IP server 50 is also shown, that is reachable via the IP router 44 and the Internet 46.

In accordance with the exemplary aspects of this invention enhanced scaling can be achieved by providing multiple physical instances of the access controller 20 and/or by clustering the access controllers 20. The details of clustering for redundancy and load sharing are discussed in further detail below.

AP-AC Tunneling

For each access point 30 there is a tunnel created towards the access controller 20 by encapsulating an IEEE 802.11 frame in an Ethernet frame with destination and source addresses being the access controller/access point, respectively. This limits the required number of MAC addresses in the intermediate Ethernet network 35 between the access point 30 and the access controller 20. The use of this technique avoids a possibility to exhaust any MAC lookup table(s) on any intermediate Ethernet switch(es) 32 (shown in FIG. 5) in the intermediate Ethernet network 35. For example, one may consider a large WLAN having 1,000,000 active stations 10 served by 50,000 access points 20. This method can reduce the capacity of the MAC switching tables to about, for example, 50,000-55,000 MAC addresses, which is well within a typical enterprise Ethernet switch 64K-128K MAC lookup table limit. When an access controller 20 has no station 10 associated with a particular access point 30 it releases the relation to that access point 30.

Each access controller 30 may be assumed, as shown in FIG. 2A, to include a table 20A that stores MAC addresses of associated stations 10, as well as information descriptive of the state of each station 10. This state can include, but need not be limited to, association, authentication, security keys and authorization information. Associated with the MAC address of a particular STA 10 is an identification of the AP 30 with which the STA 10 is currently associated.

There are several advantages that can be realized by the use of these exemplary embodiments, as compared with conventional split MAC approaches. For example, the ease of mobility that is achieved is considerable, as there is provided a single anchoring point that can be used for user context in a large WLAN. Further by example, scalability is enhanced as traffic may be load shared over multiple instances of access controllers 20.

Once the task of managing the APs 30 is removed, the access controller 20 can be fully utilized for carrying traffic and terminating part of the upper layer MAC.

STA-AC Mapping

An aspect of these exemplary embodiments is that it provides a "single home" for each STA 10, the anchoring point for any station 10 in the WLAN can be determined at the access point 30 without distributing information, such as a custom mapping table. This is accomplished by enforcing the principle that the end user (STA 10) stays with one and only one access controller 20 throughout a particular session with the WLAN. The assignment as to which access controller 20 a particular station 10 belongs is deterministic, and is based on the MAC address (MAC_ADDR) (e.g., 10A) of the station 10. When an access point 30 receives a frame from a station 10 it may determine the address of the outbound tunnel described above by calculating a hash value of the source MAC address, which reduces the address space down to N values. This hash value may then be used as an offset in a preset MAC address range for the access controllers 20.

As a non-limiting example of a very simple hash function for this purpose: assume the station 10 has an MAC address of 11:22:33:44:55:66, and the prefix for AC 20's MAC address is pre-defined as NN:NN:NN:NN:NN. One may then use the last 8 bits ("66" in this instance) as the offset for AC 20's MAC address, which renders the AC 20's address as NN:NN:NN:NN:NN:66.

The access point 30 sends, for a particular station 10, upper layer MAC traffic, control messages and user plane traffic frames to the access controller 20 by encapsulating these (IEEE 802.11) frames in an outer layer frame (or shim), such as the Ethernet frame (IEEE 802.03) shown in FIG. 2A. This shim hides the actual addresses of the station 10 and the destination. The source address of the outer shim frame (the IEEE 802.3 frame) is the address of the access point 30, and the destination address is one of an N member set of addresses determined by the hash function described above. As a result, and for the same station 10, and regardless of which access point 30 sends a station-specific frame towards the access controllers 20, the frame always is received by the same access controller 20.

The use of this technique makes it possible to preserve the state of the station 10 in the access controller 20. As was noted above, this state can include, but need not be limited to, association, authentication, security keys and authorization information. This station 10 related data stays with the (same) access controller 20 throughout a session that the station 10 has with the WLAN.

Figure 3:
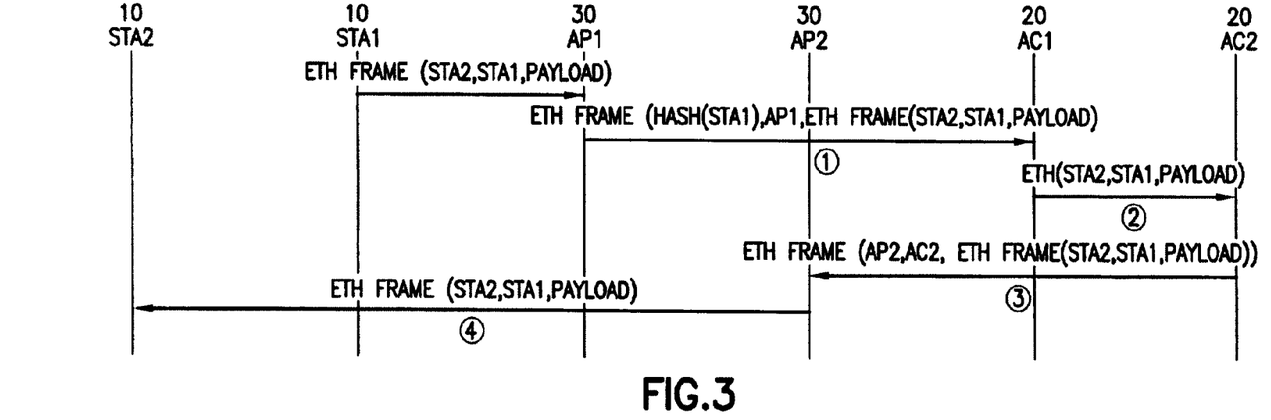
FIG. 3 is a flow diagram showing an example of data/message flow from a first station to a second station via two access points and two access controllers.

FIG. 3 is a flow diagram showing an example of data/message flow (inter-WLAN) from a first station 10 (STA1) to a second station 10 (STA2) via two access points 30 (AP1, AP2) and two access controllers 20 (AC1, AC2).

Related to Message 1 AP1 receives a frame from STA1, encapsulates the received frame in an outer frame (shim) with a destination address equal to the hash(STA1) and a source address of AP1, and sends the frame to AC1. Related to Message 2 the shim frame is received by AC1, which extracts the encapsulated 802.11 frame and determines the existence of the association between AP1 and STA1. In this example it is assumed that AC1 does not know STA2, so it sends the extracted frame to a network, such as the LAN 40 connecting the ACs 20. Related to Message 3, in response to receiving the extracted frame from the LAN 40 AC2 determines that it has knowledge of STA2 (the STA2 MAC addresses is maintained in the MAC address table 20A of AC2), and thus learns that STA2 was last located at AP2. AC2 encapsulates the IEEE 802.11 frame in an outer (e.g., Ethernet) frame with destination=AP2, source=AC2 and sends the frame to AP2. Related to Message 4, the AP2 extracts the frame from the encapsulation and sends it to STA2.

Figure 9:
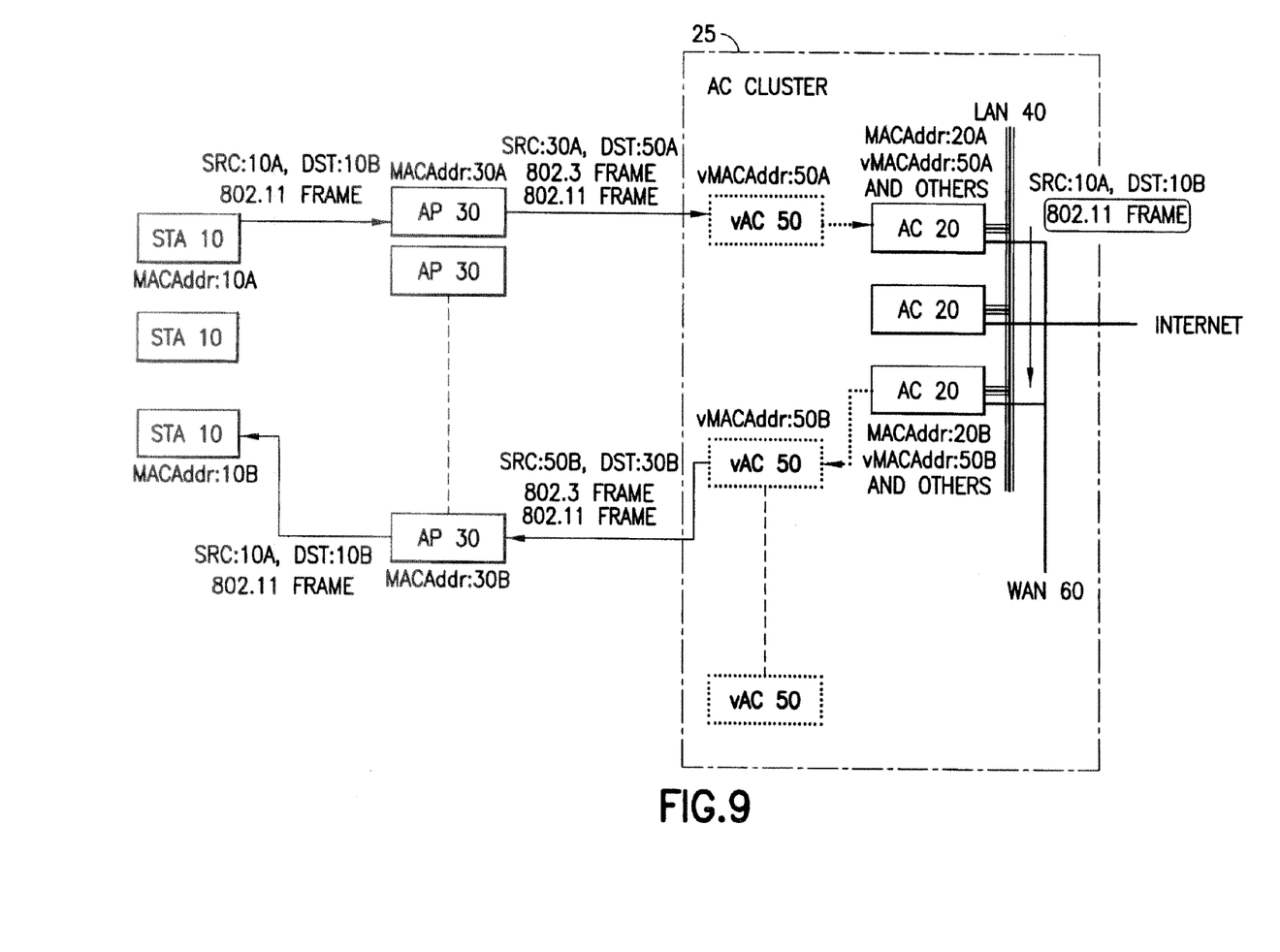
FIG. 9 shows an exemplary progression of a packet through a system based on FIG. 8.

Reference can also be made to FIG. 9, which shows an AC cluster 25 (discussed below in greater detail with regard to FIG. 8). In this example STA 10 with MAC_ADDR 10A sends an IEEE 802.11 frame to AP30, with the destination address of STA 10 with MAC_ADDR 10B. The packet is conveyed through AP 30 having MAC_ADDR 30A, and is encapsulated in an IEEE 802.3 frame. As a result of the use of the mapping function 31 the MAC_ADDR 10A is translated to the virtual MA_ADDR 50A (vMAC_ADDR) associated with a first virtual AC (vAC) 50. MA_ADDR 50A is used as destination address of the other frame, and MAC_ADDR 30A is used as source address of the outer frame. The vAC 50 having virtual MA_ADDR 50A is instantiated in AC 20 having a physical MAC_ADDR 20B, which extracts the encapsulated IEEE 802.11 frame, checks if the frame destination address is one of the STA10 associated with any vAC50 instantiated on AC20, and if not such as in this case places the frame on the LAN 40 (with source address 10A and destination address 10B). The IEEE 802.11 frame is received by AC20 (MAC_ADDR 20B) that instantiate vAC 50 having vMAC_ADDR 50B, which recognizes the MAC_ADDR 10B as being an associated STA. The IEEE 802.11 frame is encapsulated and forwarded to destination address of AP30 having MAC_ADDR 30B with a source address using vMAC_ADDR50B, vMAC_ADDR 50B is derived either from the STA association table in AC20 or by using the mapping function 31 on the destination address of the STA, i.e., STA_MAC 10B. The AP 30 having MAC_ADDR 30B receives the removes the other encapsulation ad forwards the frame to STA 10 with MAC_ADDR 10B.

AC Clustering

Another aspect of this invention relates to the clustering of access controllers 20 for achieving redundancy and load sharing. Referring to FIG. 8, in a cluster 25 of access controllers each access controller 20 may have one or more access controller addresses, that is, each access controller 20 may respond to one or more virtual MAC addresses. An important aspect of these non-limiting embodiments is that both STA 10 and AP 30 see only the virtual MAC address of the AC 20, since the entirety of the AC cluster 25 appears as a "black box" to them. The dynamic mapping of virtual MAC addresses to physical AC instances within the AC cluster 25 is totally invisible outside of the AC cluster. This facilitates a clear demarcation of functionality.

The distribution of virtual MAC addresses per physical instance may be determined by a voting procedure between the access controllers 20 based, for example, the relative processing power (e.g., CPU speed/type, network, memory capacity, etc.) of the access controllers 20. That is, one particular AC 20 may respond to more vMAC_ADDRs than another AC 20. If one physical access controller 20 is intentionally or unintentionally disabled or taken off line the other access controllers 20 share the load of the lost access controller(s) by assuming zero, one or more of the virtual MAC addresses associated with the lost access controller(s). The communication between the clustered ACs 20 is conducted using the LAN 40.

Adding another access controller 20 to a cluster is straight forward, as the existing population of access controllers 20 act to automatically redistribute one or more of the N vMAC addresses to the new access controller 20.

Each time a reallocation is performed the stations 10 that have a relation to those specific access controller MAC addresses are disconnected from the network and then reconnect, unless the state of the station 10 has been previously shared. From the end user perspective the service interruption, if any, is minimal, even if the current association is broken. This approach facilitates upgrades and downgrades of the WLAN capacity while maintaining a high level of service.

Layer 3 Enhancement

Discussed now is the handling of broadcast messages. In this case the access controller 20 may operate in a mode wherein it functions in a manner analogous to a bridge (e.g., an Ethernet bridge). In this mode broadcast frames are forwarded between the radio access network (between the STA 10 and the APs 30) and the LAN 40. Of interest in this scenario is the presence of multiple forwarding elements.

One and only one access controller 20 has the right, and the obligation, to forward a specific broadcast frame to the radio access network. All of the ACs 20 receive the broadcast frame from the LAN 40. The AC 20 that is to forward the broadcast traffic is determined by running the hash algorithm on the source address of the broadcast frame. If this process yields the virtual MAC address of the AC 20 the broadcast frame is encapsulated within the shim, where the destination address is the broadcast address (recognized by the STAs 10 as such) and the source address the virtual MAC address of the AC 20, before sending it out to the radio access network. The other ACs 20, i.e., those who do not find their MAC address as a result of running the hash function, do not forward the broadcast frame.

For broadcast traffic that comes from a station 10 the access controller 20 forwards the frame to the LAN 40 and also determines if it needs to forward the frame back to the access controller network. Note that even though the station 10 sends a frame with a broadcast address, the frame is not broadcast until it reaches the access controller 20 so that user-specific policies can be applied.

Based on the foregoing it can be appreciated that the AC 20 functions as a layer 2 device, and that the intermediate network between the APs 30 and the ACs 20, which may be a mesh or an Ethernet switched network, simply conveys frames between the APs 30 and the ACs 20. No knowledge of station or other node addresses is needed. The isolation between the STA addresses and the AP/AC addresses is achieved through the use of tunneling (MAC in MAC), e.g., by encapsulating 802.11 frames within 802.3 frames.

With regards to the STA-AC association, the AP 30 is enabled to always determine the correct AC 20 based on the MAC address 10A of the STA 10 using the mapping function 31. This enables a "lightweight" mobility to be achieved in the WLAN. As was discussed previously, the STA-AC pairing is achieved by use of the hash function from the STA MAC address 10A to one of a set of N (e.g., 256) private AC 20 MAC addresses. Assuming the use of the same hash function by all of the APs 30, the association between the STA source MAC address to the AC destination MAC address is made deterministic. While each AC 20 may typically have the physical MAC address 20B, the use of the set of virtual MAC addresses 50A, 50B, etc. (which can be changed as needed) enables the above mentioned load sharing and load balancing between the ACs 20 based on, for example, their processing power and capacity, as well as the ability to configure and reconfigure the ACs 20 to accommodate the addition and loss of ACs 20. In this latter case, a new hash function is preferably distributed to those nodes needing same. Further in this regard note that the system may be designed so that N is selected at design time so that the number of possible users can be readily accommodated by a set M of ACs 20, where N>M. This allows for some functional growth in the network. The base address for the "private" MAC address space may also be assumed to be fixed, or alternatively it may be loaded, as one example, from an operations and maintenance (O&M) system at system start.

Figure 6:
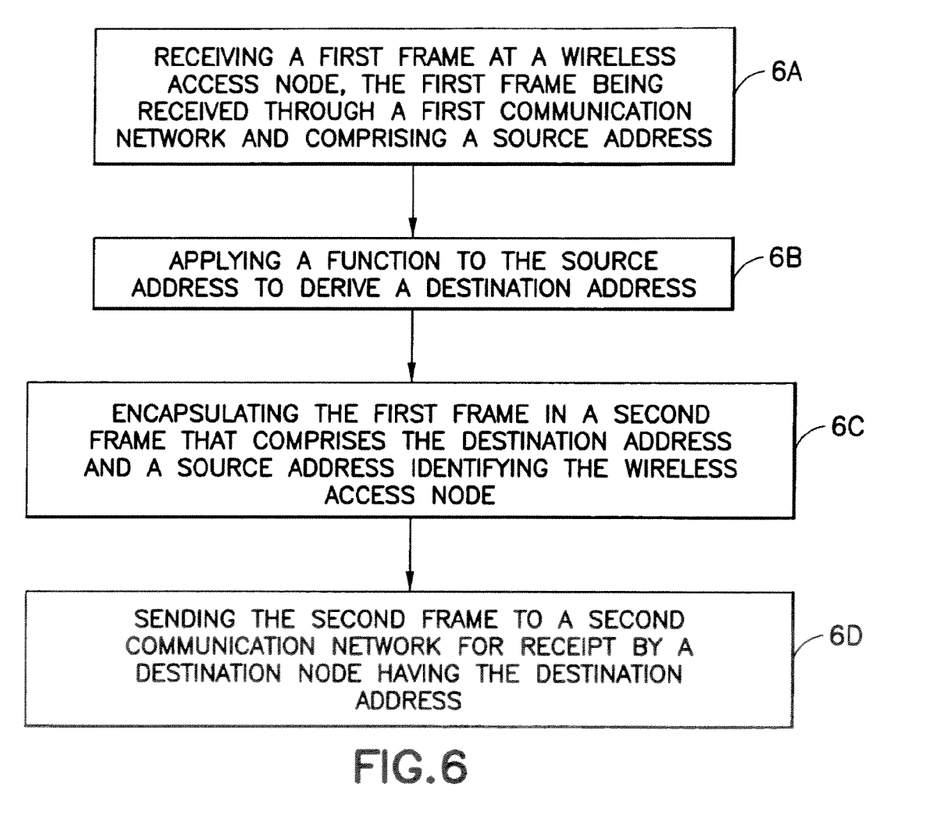
FIG. 6 is a logic flow diagram that illustrates the operation of a method, and a result of execution of computer program instructions, in accordance with the exemplary embodiments of this invention.

Based on the foregoing it should be apparent that the exemplary embodiments of this invention provide a method, apparatus and computer program(s) to enable communications in a split MAC WLAN Referring to FIG. 6 a method, and a result of execution of computer program instructions, includes (Block 6A) receiving a first frame at a wireless access node, the first frame being received through a first communication network and comprising a source address; (Block 6B) applying a function to the source address to derive a destination address; (Block 6C) encapsulating the first frame in a second frame that comprises the destination address and a source address identifying the wireless access node; and (Block 6D) sending the second frame to a second communication network for receipt by a destination node having the destination address.

In the method and computer program as described in the preceding paragraph, the first communication network may be an IEEE 802.11 network, and the second communication network may be an IEEE 802.3 network.

In the method and computer program as described in the preceding paragraphs, the function may be a hash function.

In the method and computer program as described in the preceding paragraphs, where the destination node is an access controller that comprises part of an access controller cluster, the access controller having at least one virtual MAC address, and where the at least one virtual MAC address is derived by application of the function to the source address that comprises part of the first frame.

In the method and computer program as described in the preceding paragraphs, where the destination node is an access controller that comprises part of an access controller cluster, the access controller having a plurality of MAC addresses one of which is derived by application of the function to the source address that comprises part of the first frame.

In the method and computer program as described in the preceding paragraphs, where the first frame is a broadcast frame.

In the method and computer program as described in the preceding paragraphs, and further including receiving a third frame from the second communication network, the third frame comprising a destination address of the wireless access node and a source address of an access controller; extracting a fourth frame that is encapsulated in the third frame, the fourth frame comprising a destination address identifying at least one station; and wirelessly transmitting the fourth frame to the first communication network.

Figure 7:
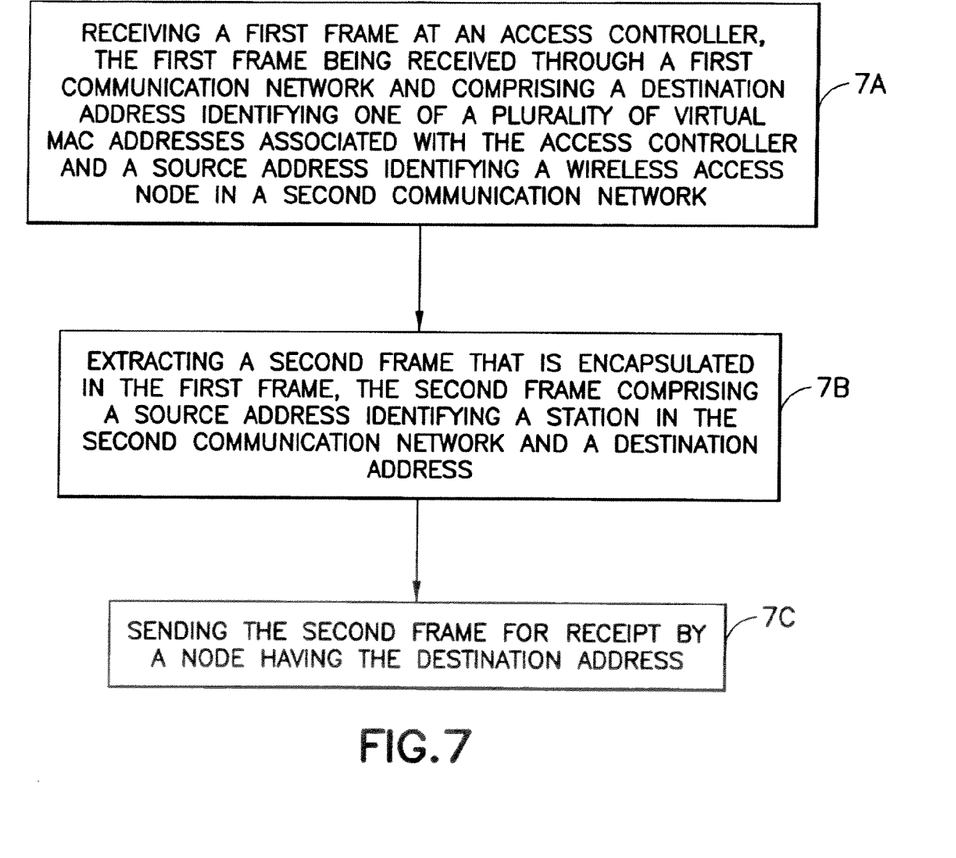
FIG. 7 is a logic flow diagram that illustrates the operation of a further method, and a result of execution of computer program instructions, in accordance with the exemplary embodiments of this invention.

Referring to FIG. 7, a further method and result of execution of computer program instructions includes (Block 7A) receiving a first frame at an access controller, the first frame being received through a first communication network and comprising a destination address that identifies one of a plurality of virtual MAC addresses associated with the access controller, the first frame further comprising a source address that identifies a wireless access node in a second communication network. At Block 7B there is a step of extracting a second frame that is encapsulated in the first frame, the second frame comprising a source address identifying a station in the second communication network and a destination address. At Block 7C there is a step of sending the second frame for receipt by a node having the destination address.

In the method and computer program as described in the preceding paragraph, where the first communication network may be an IEEE 802.3 network, and where the second communication network may be an IEEE 802.11 network.

In the method and computer program as described in the preceding paragraphs, and further comprising receiving a third frame at the access controller, the third frame comprising a destination address identifying a station in the second communication network; encapsulating the third frame in a fourth frame that comprises a destination address of a wireless access node in the second communication network and a source address identifying the access controller; and transmitting the fourth frame to the first communication network.

In the method and computer program as described in the preceding paragraph, where at least one of the first frame and the third frame is a broadcast frame.

In the method and computer program as described in the preceding paragraphs, where there are a plurality of access controllers each having a set of virtual MAC addresses, further comprising assigning at least one virtual MAC address of one of the access controllers to at least one other one of the plurality of access controllers.

In the method and computer program as described in the preceding paragraphs, where there are a plurality of access controllers each having a set of virtual MAC addresses, further comprising assigning virtual MAC addresses between the plurality of access controllers based on at least one criterion.

In the method and computer program as described in the preceding paragraph, where the at least one criterion is comprised of at least one of an access controller becoming one or enabled for operation or disabled for operation and a processing capability of at least one access controller relative to other ones of the plurality of access controllers.

In the method and computer program as described in the preceding paragraphs, further comprising receiving a broadcast frame at the access controller, the broadcast frame comprising a source address; applying a function to the source address; only if the result of applying the function results in a virtual MAC address associated with the access controller, encapsulating the broadcast frame in a fourth frame that comprises a broadcast address and a source address equal to the virtual MAC address; and sending the fourth frame to the first communication network.

The various blocks shown in FIGS. 6 and 7 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the use of IEEE 802.11 and IEEE 802.3 physical and MAC protocols, the exemplary embodiments are limited for use with only these particular specifications and standards, and that they may be used to advantage with other types of data communication specifications, standards and protocols. Further, while the use of a hash function has been discussed above, in other embodiments of this invention other suitable techniques may be used to transform a STA MAC address to an address of the AP that is associated with the STA.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
receiving, by a wireless access node, a first frame from a station through a first communication network, wherein the first frame comprises a source address that identifies the station;
deriving a destination address using the source address, wherein the destination address that identifies an access controller controlling the wireless access node, and the wireless access node is coupled to the access controller through a second communication network;
encapsulating the first frame in a second frame comprising the destination address identifying the access controller and a source address identifying the wireless access node; and
sending the second frame to the access controller having the destination address through the second communication network.

2. The method of claim 1, wherein the first communication network is an IEEE 802.11 network, and wherein the second communication network is an IEEE 802.3 network.

3. The method of claim 1, wherein the access controller owns association and authentication state of the station.

4. The method of claim 3, wherein the access controller shares the association and authentication state of the station with the wireless access node.

5. The method of claim 1, wherein the access controller comprises a medium access control address of the station.

6. The method of claim 1, wherein the destination address identifying the access controller is one of a plurality of virtual medium access control addresses for the access controller.

7. The method of claim 1, wherein the first frame is a broadcast frame.

8. The method of claim 1, further comprising:
receiving, by the wireless access node, a third frame from the access controller through the second communication network, wherein the third frame comprises a destination address identifying the wireless access node and a source address identifying the access controller;
extracting a fourth frame encapsulated in the third frame, the fourth frame comprising a destination address identifying the station; and
wirelessly transmitting the fourth frame to the station through the first communication network.

9. The method of claim 8, wherein the source address identifying the access controller is one of a plurality of virtual medium access control addresses for the access controller.

10. The method of claim 8, wherein the destination address identifying the station is a medium access control address of the station.

11. An apparatus comprising:
at least one processor; and
at least one memory including computer program code, the at least one memory and the computer program code configured, with the at least one processor, to cause the apparatus to perform:
receive a first frame, wherein the first frame is received from a station through a first communication network, wherein the first frame comprises a source address that identifies the station;
derive a destination address using the source address, wherein the destination address identifies an access controller coupled to the apparatus through a second communication network;
encapsulate the first frame in a second frame comprising the destination address and a source address identifying the apparatus; and
send the second frame to the access controller having the destination address through the second communication network.

12. The apparatus of claim 11, wherein first communication network is an IEEE 802.11 network, and wherein the second communication network is an IEEE 802.3 network.

13. The apparatus of claim 11, wherein the access controller owns association and authentication state of the station.

14. The apparatus of claim 13, wherein the access controller shares the association and authentication state of the station with the apparatus.

15. The apparatus of claim 11, wherein the access controller comprises a medium access control address of the station.

16. The apparatus of claim 11, wherein the destination address identifying the access controller is one of a plurality of virtual medium access control addresses for the access controller.

17. The apparatus of claim 11, wherein the first frame is a broadcast frame.

18. The apparatus of claim 11, wherein the at least one memory and the computer program code are further configured, with the at least one processor, to cause the apparatus to perform:
receive a third frame from the access controller through the second communication network, wherein the third frame comprising a destination address identifying the apparatus and a source address identifying the access controller;
extract a fourth frame encapsulated in the third frame, the fourth frame comprising a destination address identifying the station; and
wirelessly transmit the fourth frame to the station through the first communication network.

19. The apparatus of claim 18, wherein the source address identifying the access controller is one of a plurality of virtual medium access control addresses for the access controller.

20. The apparatus of claim 18, wherein the destination address identifying the station is a medium access control address of the station.

* * * * *